INVENTOR.
NORMAN H. SACHNIK
BY
ATTORNEY

United States Patent Office 3,265,083
Patented August 9, 1966

3,265,083
PIG HANDLING VALVE
Norman H. Sachnik, Houston, Tex., assignor to
Texsteam Corporation
Filed Oct. 4, 1963, Ser. No. 313,883
3 Claims. (Cl. 137—268)

This invention relates in general to a fluid control valve, and more particularly to a pig handling valve capable of injecting a scraper device or pig into a fluid flow line or catch a pig having been sent through a line. The valve may also serve as a shut-off or a three-way valve. Still more particularly, the present invention is capable of separating dissimilar materials being conveyed in the same line, and other purposes and functions may be apparent to one skilled in the art.

The present invention is useful as a scraper device or line cleaner where the lading fluid has caused the accumulation of waxes or solids along the internal surfaces of the line. Further, the present invention serves to remove accumulated fluids from a line where it is desired to employ the line for gaseous flow, it being readily apparent that accumulated fluids would reduce efficiency of the line during gaseous flow. Moreover, in the case of product separation, the present invention minimizes intermix of dissimilar materials being conveyed in the same line. Further, by reversing the connections at the inlet and outlet, the present valve may serve as a pig trap or catcher to receive a pig sent through a line. Finally, the valve of the present invention may also serve as a three-way or shut-off valve to thereby reduce the overall cost of a pipe line installation.

It is therefore an object of the present invention to provide an improved valve for fluid flow lines capable of injecting with the lading fluid a scraper device to remove unwanted elements from the internal surfaces of the line.

A further object of this invention is in the provision of a valve for fluid flow lines capable of injecting into the lading fluid a separator device for minimizing intermixing of dissimilar materials being conveyed in the line.

A still further object of this invention resides in the provision of a valve capable of injecting a scraper or separator device into a flow line and also to serve as a shut-off valve.

Another object of this invention is to provide a pig injector valve capable of automatic injection of pigs on a sequenced basis.

Still another object of this invention is to provide a pig handling valve capable of serving as a pig trap or catcher to receive a pig sent through a line.

A further object of this invention is to provide a pig handling valve that may serve to inject pigs into a line or receive pigs sent through a line.

Another object of this invention is to provide a valve that may serve as a pig handling valve or a three-way valve.

Other objects, features and advantages of the invention will be apparent from the following detailed disclosure, taken in conjunction with the accompanying sheets of drawings, wherein like reference numerals refer to like parts, in which:

FIG. 3 is a side elevational view of the valve of FIG. 1;

Figure 1:
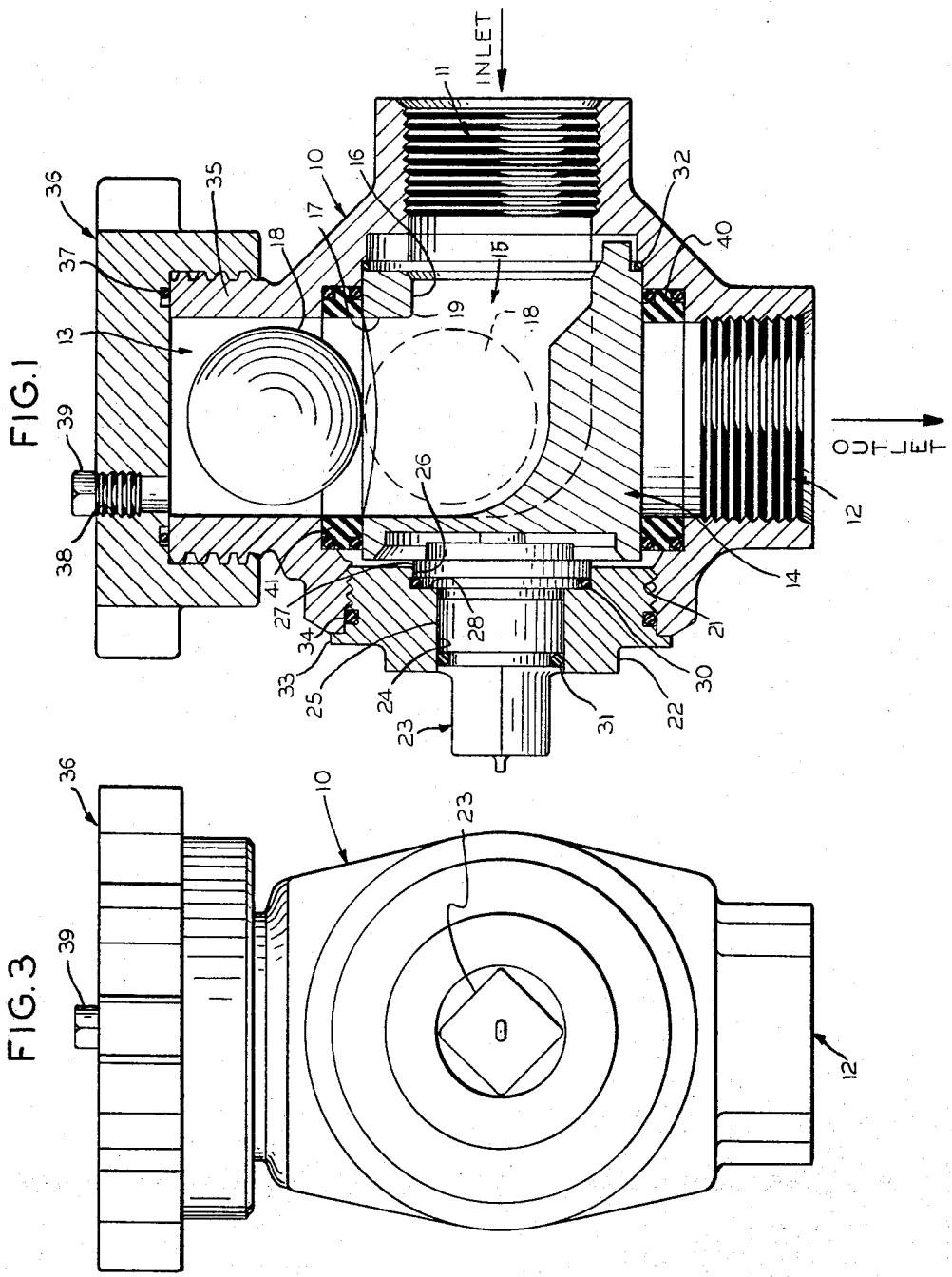
FIG. 1 is a vertical sectional view taken through a pig injection valve according to the present invention.
Figure 2:
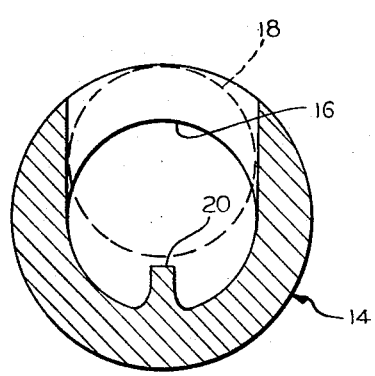
FIG. 2 is a detail sectional view taken substantially along line 2—2 of FIG. 1.

Referring now to the drawings and particularly to FIG. 1, the valve of the present invention in its preferred form includes a valve body generally designated by the numeral 10. The valve body includes generally a fluid inlet 11, a fluid outlet 12, a pig injector inlet 13 and a plug 14.

The fluid inlet and the fluid outlet are suitably tapped to receive fittings for connecting the valve to lines or pipes. As seen in FIG. 1, the valve is in an upright position and it is intended that it operate in this position when installed in a pipe line installation. The axis of the fluid inlet 11 is horizontal, while the axis of the fluid outlet 12 is vertical, thereby situating the fluid outlet in perpendicular relation to the fluid inlet. The axis of the pig injector inlet 13 is along the vertical and coaxial with the axis of the fluid outlet 12.

Figure 4:
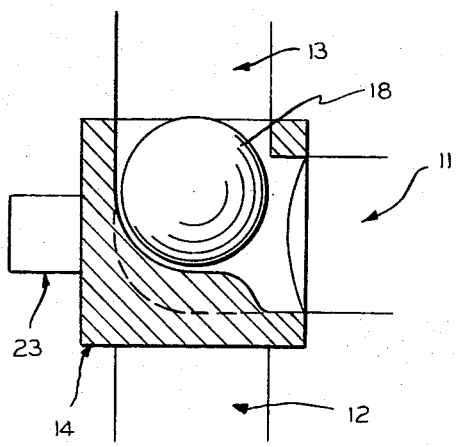
FIG. 4 is a schematic view of the valve according to the invention and illustrating the position of the plug when in shut-off position and to provide access to the pig injector housing.
Figure 5:
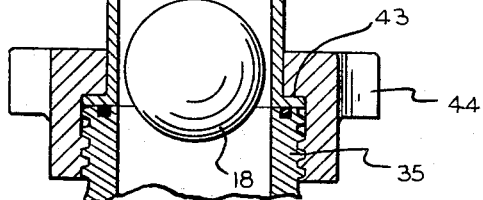
FIG. 5 is a schematic view similar to FIG. 4, but illustrating the plug in the position for injecting a pig into the line and for allowing fluid flow through the valve.

A cavity is provided in the valve body 10 to receive the plug 14 which is substantially cylindrically shaped and rotatable along a horizontal axis coaxial with the fluid inlet 11. An angular passageway 15 extends through the plug 14 and includes an inlet opening 16 of a diameter substantially equal to the diameter of the fluid inlet 11 and extending coaxial therewith. Inasmuch as the axis of rotation of the plug 14 is coaxial with the fluid inlet 11, the plug inlet opening 16 is continually in communication with the fluid inlet 11 no matter what position the plug attains. The angular passageway 15 also includes an outlet opening 17 of a diameter substantially equal to the diameter of the fluid outlet 12 and the diameter of the pig injector inlet 13. When the plug 14 is in one position as shown in FIGS. 1 and 4, the outlet opening 17 is in communication with the pig injector inlet 13, and when the plug is rotated 180° as shown in FIG. 5, the outlet opening 17 is in direct communication with the fluid outlet 12. The fluid passageway 15 is of a size capable of receiving a pig or ball scraper such as the pig 18 shown in FIGS. 1, 4 and 5. Thus a cavity is defined in the passageway 15 for receiving a pig. However, a necked down portion 19 is provided in the fluid passageway 15 between the cavity receiving the pig and the inlet opening 16 to prevent accidental movement of the pig from the cavity of the plug 14 into the fluid inlet 11. A ridge 20 is provided along the passageway 15 of the plug 14 to define the necked down portion 19.

A tapped opening 21 is provided in the valve body 10 coaxially with the plug 14 and to receive a retaining nut 22 that retains a plug stem 23 in position and against the plug 14 to properly locate the plug within the valve body. A bore 24 is provided in the retaining nut 22 to bearingly receive a cylindrical portion 25 of the stem 23. An enlarged bore 26 is provided in the retaining nut 22 inwardly of the bore 24 to bearingly receive an enlarged cylindrical portion 27 of the stem 23. A shoulder 28 is provided between the bores 24 and 26 which bears against a shoulder 29 of the stem 23 and receives the thrust of the plug 14. A notched out portion is provided in the retaining nut 22 and mates with a notched out portion in the stem 23 to receive stem packing 30 for sealing the stem with the retaining nut. Additionally an annular groove is provided in the stem along the cylindrical portion 25 to define a cavity for receiving other stem packing 31 and further guard against leakage along the stem. The inner end of the stem 23 is suitably constructed to lockingly engage with the plug 14 so that rotation of the stem effects rotation of the plug. Also the inner end of the stem bears against the plug and forces it to seat against a plug support 32 carried by the valve body 10 adjacent the fluid inlet 11. The retaining nut 22 seats against the valve body by means of a flange 33, and leakage along the retaining nut is precluded by means of nut packing 34.

An extension 35 is provided at the pig injector inlet 13 and dimensioned so that it can receive a pig 18. A nut 36 is received on the extension 35 for sealing the pig injector inlet from the atmosphere. An O-ring 37 is provided in the nut 36 to prevent leakage between the extension and the nut. Further, a tapped opening 38 is provided in the nut or cover 36 to receive a plug 39 for reasons that will be more clearly hereinafter explained.

An annular seat 40 is provided at the inner end of the fluid outlet 12 and between the outlet and the plug 14 for purposes of effecting a seal between the plug and the opening when the plug is in the position shown in FIGS. 1 and 4. Similarly, a seat 41 is provided at the inner end of the pig injector inlet 13 to define a seal between the plug 14 and the pig injector inlet when the plug is in the position as shown in FIG. 5.

In operation of the valve when fluid or gas is flowing through the valve, the plug 14 will be positioned so that the outlet opening 17 of the plug passageway 15 aligns with the fluid outlet 12. If it is desired to stop flow of a fluid or gas in the line having the valve of the present invention, the stem 23 may be rotated to drive the plug 14 to the position shown in FIGS. 1 and 4. Thereafter, if it is desired to inject a pig or ball scraper into the line, with the fluid or gas shut off ahead of the valve, the plug 39 may be removed from the tapped opening 38 to permit the pressure within the valve to be reduced to atmospheric pressure. Then the nut 36 can be removed to permit insertion of a pig or ball scraper 18 which would drop into the plug 14. The nut 36 and plug 39 would then be replaced to close the pig injector inlet 13, and then the stem 23 would be operated to rotate the plug 14 180° so that the outlet opening 17 would align with the fluid outlet 12 so that the pig 18 could enter the fluid outlet. Thereafter with the fluid or gas pressure continued, the pig 18 or ball scraper would be forced through the line to clean same. Similarly, when it is desired to convey dissimilar materials in the same line, the pig 18 may be employed as a separator to minimize intermixing of the materials. While the pig 18 is preferably ball-shaped as shown, it will be appreciated that it may take other shapes depending upon the particular installation.

While the valve of the present invention has been described as a pig injector valve for injecting pigs into a line, it should be appreciated that the valve may likewise be employed as a pig trap or catcher, wherein it would serve to receive a pig sent through a line and thereafter remove it from the line. In this situation, the outlet 12 would be employed as the inlet while the inlet 11 would be employed as the outlet. Moreover, the pig injector inlet 13 would serve as a pig outlet. The valve then may be positioned with the inlet 13, now an outlet, in position below the plug 14 so that the ball may fall from the plug into the outlet when the plug is aligned as in FIG. 4. Alternatively, the ball may be removed even if the valve is positioned as in FIG. 1 by momentarily reversing the flow with the bleeder plug 38 removed to drive the ball into the inlet 13.

The valve of the present invention can also be employed as a three-way valve by using the inlet 11 as an inlet, and the outlet 12 and pig injector inlet 13 as outlets, wherein the plug may selectively intercommunicate the inlet with either outlet or shut off flow completely by having the outlet opening 17 of the plug 14 positioned between the outlets.

Figure 6:
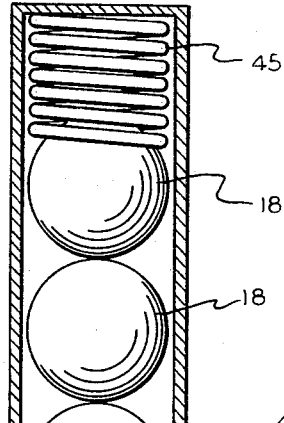
FIG. 6 is a vertical elevational view, fragmentary in nature, of a modified pig injection housing.

Should it be desired to provide automatic injection of pigs on a sequenced basis, the nut 36 may be replaced by an elongated magazine type cover 42 as shown in the embodiment of FIG. 6. The cover 42 is flanged at 43 to bear against the end of the extension 35, and a retaining nut 44 locks the flange 43 and cover 42 to the extension 35. In this instance, the elongated cover 42 may contain a number of pigs 18 which may be fed on a sequenced basis through the line. It should be appreciated that only one pig may be fed into the plug 14 at one time.

For installations other than where the valve is in the position as shown in FIG. 1 and the pig drops along the vertical into the plug 14, a spring 45 may be provided to force the ball into the plug as shown in FIG. 6. Other biasing means may be provided to urge the balls into the plug.

It will be understood that modifications and variations may be effected without departing from the scope of the novel concepts of the present invention, but it is understood that this application is to be limited only by the scope of the appended claims.

The invention is hereby claimed as follows:

1. A pig injector valve comprising, a body having an inlet, an outlet at right angles to said inlet, a pig chamber diametrically opposite said outlet for receiving a pig, means for closing the end of the pig chamber remote from the body, a plug in said body having a pig receiving chamber with an inlet and an outlet, said pig receiving chamber inlet always in communication with said body inlet and said plug movable between a first position for intercommunicating the pig receiving chamber outlet with said body outlet and a second position for preventing communication therebetween, said pig receiving passageway outlet communicating with said pig chamber in said second position to load a pig in the pig receiving passageway of said plug, said plug sealingly closing said pig chamber in said first position, and ridge means in said pig receiving chamber opposite said pig receiving chamber outlet and axially extending relative to said pig receiving chamber inlet to prevent movement of a pig through said inlet.

2. A pig injector valve as defined in claim 1, and means in said pig chamber continually urging a pig therein towards said plug.

3. A pig injector valve as defined in claim 2, wherein said means is a spring.

References Cited by the Examiner

UNITED STATES PATENTS

| | | | |
|---|---|---|---|
| 2,471,941 | 5/1949 | Downey | 137—625.47 |
| 2,623,226 | 12/1950 | Jones | 15—104.06 |
| 3,000,028 | 9/1961 | Buie | 15—104.06 |
| 3,125,116 | 3/1964 | Shaberg | 137—268 |

WILLIAM F. O'DEA, Primary Examiner.

ISADOR WEIL, MARTIN P. SCHWADRON, Examiners.

A. COHAN, Assistant Examiner.